UNITED STATES PATENT OFFICE.

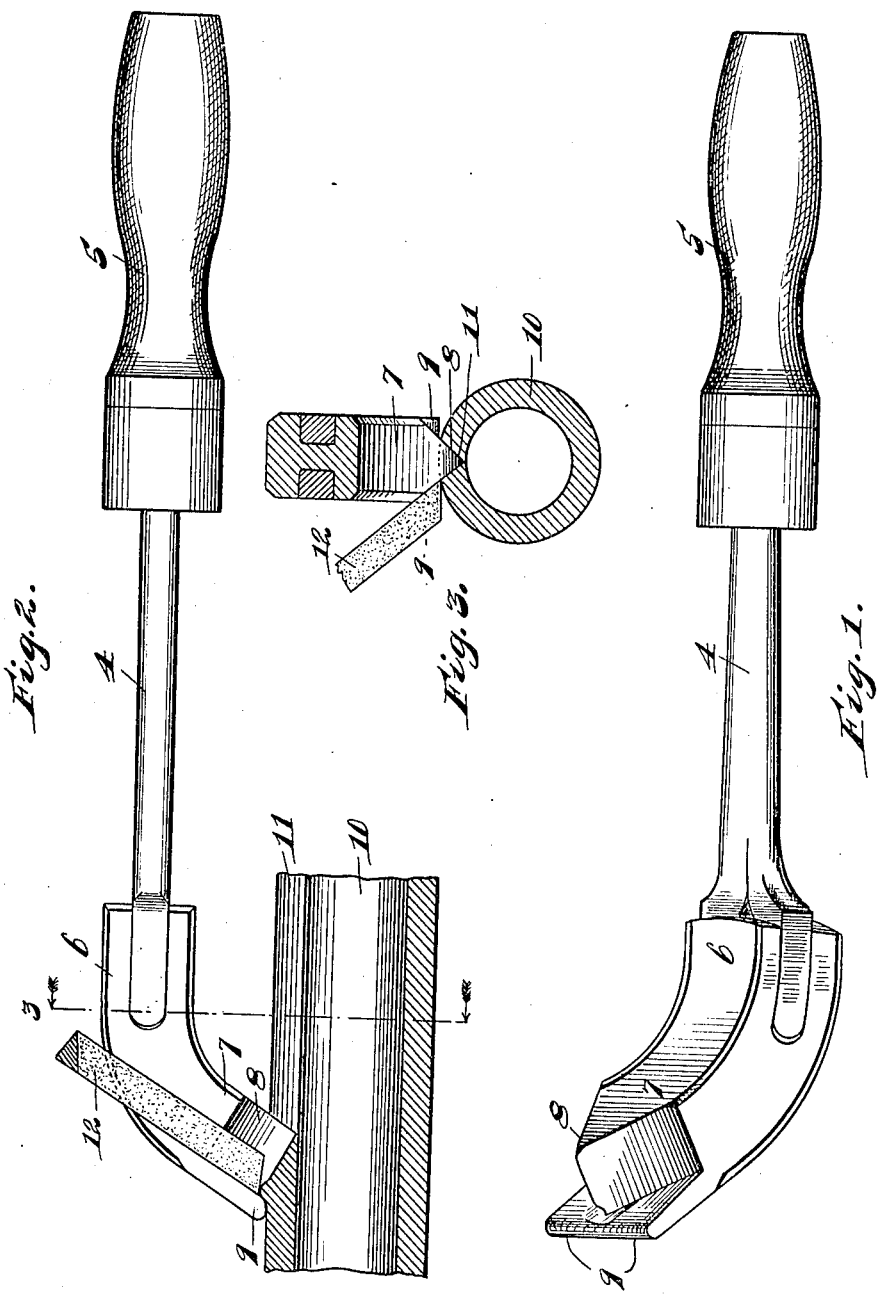

HERMAN H. KRUEGER, OF CHICAGO, ILLINOIS.

SOLDERING-IRON.

1,291,557.   Specification of Letters Patent.   Patented Jan. 14, 1919.

Application filed November 7, 1917.   Serial No. 200,682.

*To all whom it may concern:*

Be it known that I, HERMAN H. KRUEGER, a citizen of the United States, and a resident of the city of Chicago, county of Cook, and State of Illinois, have invented certain new and useful Improvements in Soldering-Irons, of which the following is a specification.

My invention relates to improvements in soldering irons and has for its object the provision of an improved construction of this character, especially adapted for the sealing or soldering of split lip pipes or the like, and by means of which a perfectly sealed joint may be made with great expedition.

The invention consists in the combinations and arrangements of parts hereinafter described and claimed.

The invention will be best understood by reference to the accompanying drawings forming a part of this specification, and in which, Figure 1 is a perspective view of a soldering iron embodying the invention.

Fig. 2, a side view of the same shown in position of use, and,

Fig. 3, a transverse section on line 3—3 of Fig. 2.

The preferred form of construction as illustrated in the drawings comprises a soldering iron having the usual shank or stem 4 and the usual wooden handle 5 thereon. The soldering body or "point" 6 has its extreme end or point 7 turned sharply at an angle to the body thereof, as shown, and provided with a wedge shaped end or operating point 8 and a transverse riding lip 9 extending laterally from each side of the outer edge or end of the point 8 as shown.

The soldering iron is especially adapted for sealing or closing the joints in split lead tubes or pipes, one of said pipes 10 being illustrated in Figs. 2 and 3 and having a substantially V-shaped groove or slit 11 extending along one side thereof and giving access to the interior. In use the soldering iron is run along said groove as indicated in Figs. 2 and 3, with its wedge shaped point 8 extending into the groove 11 as shown, the riding lip 9 riding upon the outer or top surface of the pipe 10, a triangular piece of solder being held in one of the recesses of the soldering iron as indicated. The point 8 fitting in the sides of the groove 11 serves to tin and properly prepare the same for the reception of the solder, which flows into the groove and is "floated" therein by the action of the soldering iron, the lip 9 serving to smooth the outer surface of the joint substantially flush with the normal outer surface of the pipe 10. By this means the joint or groove in the pipe may be readily and efficiently sealed or closed with great expedition.

While I have illustrated and described the preferred form of construction for carrying my invention into effect this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A soldering iron having a wedge shaped point turned at an angle to the body thereof; and a riding lip at one end of and extending laterally to each side of said point, substantially as described.

2. A soldering iron provided with a point adapted to enter a groove; and a riding lip extending laterally to each side of said point and adapted to ride upon the edges of said groove, substantially as described.

3. A soldering iron provided with a wedge shaped point; and a riding lip extending laterally to each side of said point, substantially as described.

In witness whereof I have signed my name to this specification in the presence of two subscribing witnesses.

HERMAN H. KRUEGER.

Witnesses:
JOSHUA R. H. POTTS,
MILDRED E. ANDERSON.

Copies of this patent may be obtained for five cents each, by addressing the "Commissioner of Patents, Washington, D. C."